(No Model.)

J. FAIRFIELD.
CAR WHEEL.

No. 605,542.  Patented June 14, 1898.

Witnesses:
Fenton S. Belt.
J. Albillson

Inventor:
James Fairfield,
by H. B. Wilson,
Attorney.

United States Patent Office.

JAMES FAIRFIELD, OF MANCHESTER, NEW HAMPSHIRE.

CAR-WHEEL.

SPECIFICATION forming part of Letters Patent No. 605,542, dated June 14, 1898.

Application filed May 17, 1897. Serial No. 636,950. (No model.)

*To all whom it may concern:*

Be it known that I, JAMES FAIRFIELD, a citizen of the United States, residing at Manchester, in the county of Hillsborough and State of New Hampshire, have invented certain new and useful Improvements in Car-Wheels; and I do declare the following to be a full, clear, and exact description of the invention, such as will enable others skilled in the art to which it appertains to make and use the same.

My invention relates to car-wheels.

The object of my invention is to provide a car-wheel in two sections to facilitate the renewal of the wheels when worn out or broken. As at present done the wheels are made in one piece, the hub is bored out to a tight fit for the axle, and the wheel is then forced into the axle with a hydraulic pressure varying from thirty to fifty tons. Consequently when the wheel is to be renewed it has to be forced off in like manner, which can only be done by removing the axle and wheels from the car and in many cases sending it away to the original maker or to some shop equipped with hydraulic presses. This entails the loss of the use of the car, the transportation charges on wheels and axle going and returning, the expense of the work, and also the labor necessary to remove it from and replace it beneath the car. Under my invention this expense will be saved, as I shall make the car-wheel in two sections—viz., a flanged hub or central portion of the wheel and the body of the wheel or outer portion. The hub will be placed on the axle in the customary manner. The body of the wheel will then be put in place on the hub and securely bolted thereto, using checknuts to prevent loosening of the bolts. To prevent any shearing strain on the bolts, suitable projections are provided on the body of the wheel, which fit into corresponding recesses in the hub. To prevent the bolts from turning around when the nuts are being tightened, the bolt-holes on the body of the wheel will be recessed to take the heads of the bolts. In renewing the wheel all that it is necessary to do is to remove the bolts attaching the body of the wheel to the hub, take off the body of the wheel, put on the new one, and replace the bolts. As this can be done in a short time, the use of the car is not delayed to any extent. To facilitate this quick renewal, the fit or joint between the body of the wheel and the hub should be a taper one.

Figure 1:
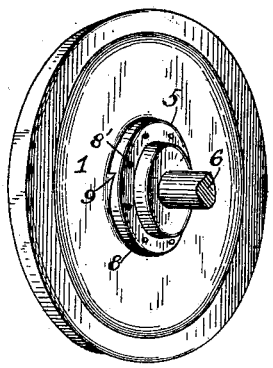
Figure 2:
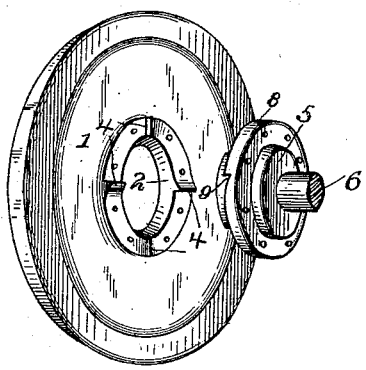
Figure 3:
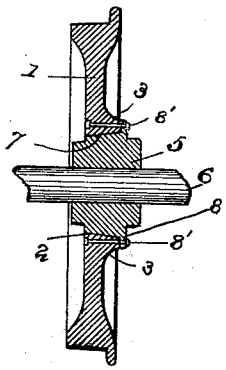

In the accompanying drawings, Figure 1 is a perspective view of a car-wheel constructed in accordance with my invention. Fig. 2 is a similar view, the body and hub of the wheel being shown separated; and Fig. 3 is a sectional view.

In said drawings, 1 denotes the car-wheel, formed with a tapering aperture 2, about which the body of the wheel is enlarged, as shown at 3, and provided with projections 4. 5 denotes the hub, which is secured to the axle 6 in the usual manner and which is provided with a tapering portion 7 and an annular flange 8, having recesses 9 to correspond to the projections.

In assembling the parts the body of the wheel is put on the hub with the affixed axle, so that the projections engage the recesses. Bolts 8' are inserted through the annular flange and through the thickened portion of the body of the wheel and serve to prevent the lateral displacement of the body of the wheel with respect to the hub.

Having thus described my invention, what I claim, and desire to secure by Letters Patent, is—

A car-wheel composed of a body portion and a hub, the former being provided with a central tapering aperture and with an integral annular shoulder surrounding said aperture and provided with projections and bolt-holes, and the latter being tapering in form and adapted to the central aperture, and provided with an annular flange having recesses adapted to receive the projections of the body portion, and bolt-holes registering with the bolt-holes of the body portion, and bolts passing through the annular flange of the hub and the annular shoulder of the body of the wheel, substantially as set forth.

In testimony whereof I hereunto affix my signature in presence of two witnesses.

JAMES FAIRFIELD.

Witnesses:
 GEO. E. BISHOP,
 W. R. FORSAITH.